United States Patent [19]

Presley

[11] Patent Number: 4,661,882
[45] Date of Patent: Apr. 28, 1987

[54] POWER SUPPLY/SINK FOR USE WITH SWITCHED INDUCTIVE LOADS

[75] Inventor: Donald r. Presley, Lexington, Ky.

[73] Assignee: IBM Corporation, Armonk, N.Y.

[21] Appl. No.: 813,314

[22] Filed: Dec. 24, 1985

[51] Int. Cl.$^4$ .................................................. H01H 47/00
[52] U.S. Cl. .................................... 361/159; 361/153; 318/696; 318/685
[58] Field of Search .................... 323/287; 363/18–21; 318/696, 685; 361/153, 159

[56] References Cited

U.S. PATENT DOCUMENTS

| | | | |
|---|---|---|---|
| 3,486,096 | 5/1967 | Van Cleave | 318/138 |
| 3,949,278 | 4/1976 | Kinnard et al. | 361/152 |
| 4,067,055 | 1/1978 | Koetsch | 361/159 |
| 4,129,816 | 12/1978 | Feldy et al. | 318/696 |
| 4,164,697 | 8/1979 | Everett | 318/696 |
| 4,223,260 | 9/1980 | Beer et al. | 318/696 |
| 4,278,926 | 7/1981 | Bartlett | 318/696 |
| 4,295,083 | 10/1981 | Leenhouts | 318/696 |
| 4,454,558 | 6/1984 | Huddart | 361/153 |
| 4,533,861 | 8/1985 | Rogers et al. | 318/696 |

Primary Examiner—William M. Shoop, Jr.
Assistant Examiner—Saul M. Bergmann
Attorney, Agent, or Firm—Pollock, Vande Sande & Priddy

[57] ABSTRACT

A power supply/sink for use with switched inductive loads includes a transformer with a first secondary winding for generating power supply current connected in a circuit with a power supply terminal. A second secondary winding is connected in a circuit to a power sink terminal. The two secondary windings are interconnected with a controlled conduction path which is arranged to supply sink current in response to variations in the voltage at the power sink terminal.

13 Claims, 21 Drawing Figures

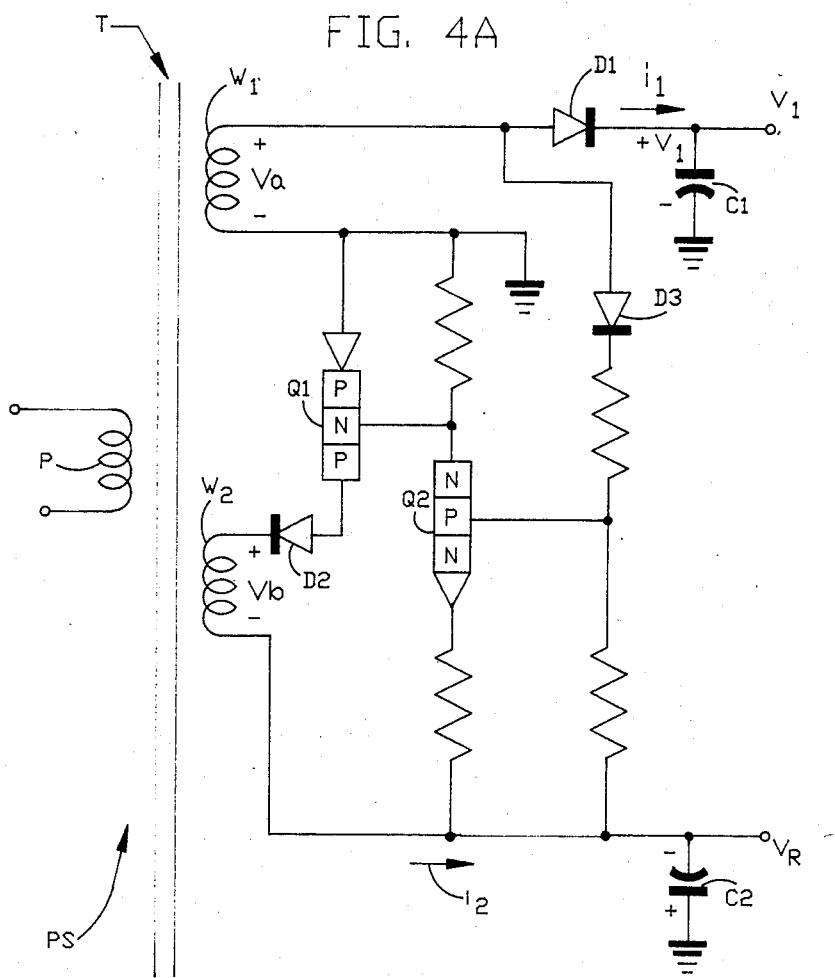
FIG. 4A
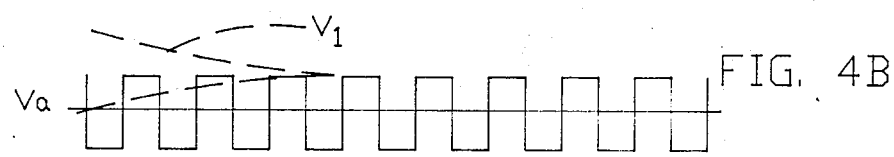
FIG. 4B
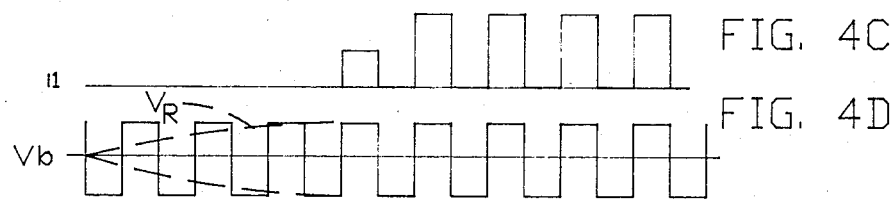
FIG. 4C
FIG. 4D
FIG. 4E

POWER SUPPLY/SINK FOR USE WITH SWITCHED INDUCTIVE LOADS

DESCRIPTION

1. Field of the Invention

The present invention relates to a power supply which provides both power supply and power sink terminals for respectively supplying and sinking power. The power supply finds particular utility in connection with inductive loads, especially where the performance of the inductive loads can be enhanced by sinking power, such as in stepper motors and the like.

2. Background Art

In the course of their operation, many types of inductive loads undergo voltage transitions, both off/on and on/off transitions. In many loads such as in stepper motors and print hammers, it is important to be able to make these transitions as fast as possible. The prior art has recognized that the speed of the off/on transition can be enhanced by controlling the voltage applied to the windings during the course of this transition, see for example Van Cleave U.S. Pat. No. 3,486,096 and Rogers et al U.S. Pat. No. 4,533,861. Likewise, the art has recognized that the speed of the on/off transition can be enhanced by sinking power from the winding undergoing the on/off transition, see for example Beer et al U.S. Pat. No. 4,223,260; Feldy et al U.S. Pat. No. 4,129,816; Everett U.S. Pat. No. 4,164,697; Bartlett U.S. Pat. No. 4,278,926 and Leenhouts U.S. Pat. No. 4,295,083.

In some cases, the power from the winding undergoing an on/off transition is returned to the power supply at a voltage identical to the supply voltage. However, at least Beer et al U.S. Pat. No. 4,223,260 has recognized that the speed of the transition can be further enhanced by returning power to a voltage terminal which is maintained at a voltage different from the power supply terminal. In Beer et al, for example, the supply voltage is positive, whereas the power from a winding undergoing an on/off transition is directed to a different voltage, a voltage of negative polarity. However, Beer et al actually dissipate the power returned from the winding in the resistor R64; as a consequence, the power thus dissipated generates heat which is undesirable. As an alternative to dissipating this power in a resistive load or returning the power to the supply, the prior art also contemplates storing this power intermittently in a capacitor, see for example Rogers et al. The difficulty with using a capacitor to store energy from a winding is that unless the transitions the load exhibits are particularly predictable, the voltage on a capacitor can rise to unacceptable levels, and typically some sort of voltage regulation is required. Of course, to the extent that the power storing capacitor is multiplied, any necessary voltage regulating apparatus is also multiplied.

SUMMARY OF THE INVENTION

The invention provides a power supply which, in addition to the conventional supply terminal, includes a power sink terminal. In one embodiment of the invention, the power sink terminal is maintained at a voltage of a polarity different from the supply polarity, and in another embodiment of the invention, the polarity of the voltage at the power sink terminal is maintained of the same polarity at the power supply terminal, although of increased magnitude. Undesirable heat is avoided by eliminating reliance on power dissipation, and rather power returned from a winding undergoing an on/off transition is returned to the power supply transformer via a winding. This also eliminates the necessity for regulating the voltage on a capacitor which is used to temporarily store power returned from a winding undergoing an on/off transition. Voltage regulation at the power sink terminal is relatively simply effected by the addition of a necessary power sink winding, as well as some transistors and diodes.

The transistors are biased by the voltage across the transformer's supply winding to establish a threshold level. In one embodiment (where the recovery voltage is opposite in polarity to the supply voltage), at the on/off transition the voltage at the sink terminal tends to drop (rise in absolute value). This results in conduction by a transistor to provide current flow in a power sink winding to stabilize or regulate the recovery voltage. In the other embodiment (where the recovery voltage has the same polarity as the supply, but is of increased magnitude) at the on/off transition the voltage at the sink terminal tends to rise. This results in conduction by a transistor to provide recovery current flow in the power sink winding to stabilize or regulate the recovery voltage. Hence, in both embodiments the tendency of the recovery voltage to rise in magnitude results in the flow of current through the power sink winding.

In connection with the embodiment of the invention in which the power sink terminal is maintained at a polarity different from the polarity of the power supply terminal, additional advantages accrue. It is typical in stepper motors, and other inductive loads, to attempt to maintain the average current through the load at some preselected level. This is controlled by passing the load current through a sense resistor and monitoring the voltage across the sense resistor. In many prior art drivers, the current through the sense resistor is discontinuous, being terminated when the winding undergoes an on/off transition. This produces switching noises in the sense voltage. By applying this embodiment of the invention, current through the sense resistor is continuous and switching noise is eliminated. In addition, inasmuch as the current sensing voltage is now continuous or substantially continuous, it can be filtered by an RC network before being applied to a current control circuit. This allows control of the average value of current instead of the peak value as is necessarily employed in existing designs. Such a control (by the average value as opposed to peak value) eliminates changes in the average value of motor current caused by changes in current ripple during chopping.

Many prior art driver circuits are bilateral employing pairs of transistor switches and diodes for each winding. As will be described, use of the inventive power supply (with the associated power sink terminal) enables the driver to be altered so that it only requires a single transistor switch/diode. This allows a substantial part count reduction. Furthermore, the inventive power supply can drive multiple loads in parallel, thus multiplying the part count reduction advantage. In other types of drivers, the bilateral nature is retained, however the invention affords speed advantages as compared to prior art arrangements.

Thus, in accordance with the invention, a power source/sink for use with an inductive load which is switched between energized and de-energized states, to reduce flyback time by sinking power from the load as the load is de-energized includes a transformer, and power supply terminal which is coupled to a winding of the transformer by rectifying and energy storage means, for supplying power to the load. The power source/sink also includes a power sink terminal, energy storage means coupled between a voltage reference and the power sink terminal, and controlled conduction means for coupling a further winding of said transformer across said sink terminal and a voltage reference permitting regulation of the voltage at the sink terminal in response to the power sink terminal tending to rise in voltage magnitude.

The invention also comprehends the power source/sink and its connected drivers which are configured to take advantage of the characteristics of the power source/sink.

BRIEF DESCRIPTION OF THE DRAWINGS

The present invention will now be described in further detail so as to enable those skilled in the art to make and use the same in the following portions of this specification when taken in conjunction with the attached drawings in which like reference characters identify identical apparatus and in which:

FIG. 1 is a driver circuit for a print hammer whereas FIGS. 7A and 8A are stepping motor drivers;

FIG. 4A is a schematic of one embodiment of the inventive power supply, and FIGS. 4B–4E illustrate associated waveforms;

DETAILED DESCRIPTION OF PREFERRED EMBODIMENTS

Figure 1:
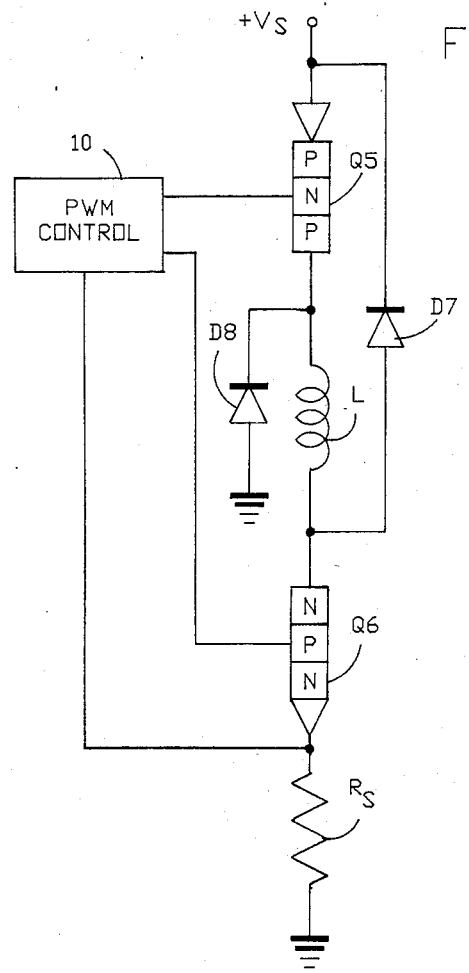
FIGS. 1, 7A and 8A illustrate inductive loads and the associated driving circuits of conventional types, in particular

Referring now to FIG. 4A, a schematic of an embodiment of the inventive power supply PS is illustrated. As shown in FIG. 4A, a transformer T includes a primary winding P and secondary windings $W_1$ and $W_2$. Other secondaries can clearly also be provided for other purposes. One terminal of winding $W_1$ is coupled to ground and the other is coupled through a diode D1 to a terminal $V_1$, which is coupled to ground through a polarized capacitor C1. In addition, a second secondary winding $W_2$ has one terminal coupled to a sink terminal $V_R$, which is also coupled to ground through a polarized capacitor C2. The other terminal of the winding $W_2$ is coupled to the cathode of a diode D2, whose anode is coupled to the collector of a transistor Q1, whose emitter is coupled to ground. The base of transistor Q1 is coupled to the collector of a transistor Q2 and through a resistor to ground. The emitter of transistor Q2 is coupled through a further resistor to a terminal of the winding $W_2$. The anode of the diode D1 is coupled to an anode of a diode D3, whose cathode is coupled through a further resistor to the base of transistor Q2. The base of transistor Q2 is, through an additional resistor, coupled to the terminal $V_R$.

When the primary winding P is energized with a suitable energizing potential (of substantially rectangular form), the voltage va across the winding $w_1$, is, in an idealized form, as shown in FIG. 4B. While the voltage at the source terminal $V_1$ normally will not exceed the peak value of the voltage va in load circuits of the type discussed herein, if such a larger voltage at the terminal $V_1$ were applied as an initial condition, no charging current $i_1$ (FIG. 4C) would be drawn. If the source terminal $V_1$ were coupled to a load, energy would be drawn from the capacitor C1 until the voltage $V_1$ had decreased to approximately the peak value of the winding voltage va. Subsequently, current $i_1$ would be drawn to regulate the voltage at the source terminal.

The voltage at sink terminal $V_R$, in normal operation with loads of the type described herein, is typically initially at a zero potential and increases in absolute value up to the peak value of the voltage vb of the winding $w_2$. As will be described below, when the terminal $V_R$ is coupled to an inductive load, to supply inductive recovery current (to sink power), the voltage at the terminal $V_R$ achieves an equilibrium potential approximately equal to the peak value of the voltage vb. The waveform of the recovery current $i_2$ is illustrated in FIG. 4E. The current $i_2$ flows out of the terminal $V_R$, but since the voltage at this terminal is negative, this direction of current flow results in sinking power into the power supply.

Recovery current flow is dictated by winding or load transitions. When recovery current flows due to a load transition, the voltage at terminal $V_R$ tends to rise in absolute value (tends toward a more negative value). However, as will be explained below, once the voltage at terminal $V_R$ exceeds (in absolute value) a predetermined threshold, current flows through the winding $w_2$. Current flow in the winding $w_2$ to maintain an equilibrium potential at the terminal $V_R$ provides for voltage regulation since vb is related to va by the winding turns ratio.

The voltage/current relationships at the supply ($V_1$) and sink ($V_R$) are symmetrical. At the supply terminal (once capacitor C1 is charged), current supplied to the load from capacitor C1 results in a tendency for the voltage at $V_1$ to decrease. The supply winding $W_1$ supplies current $i_1$ to counteract this tendency. At the sink terminal, the situation is reversed. As the load undergoes an on/off transition, the voltage at $V_R$ tends to rise (in absolute value). This rise produces a flow of current $i_2$ to keep the voltage $V_R$ stabilized. It should be noted that the voltage $V_1$ cooperates with the diode D3 and the transistor Q2 (and their associated resistors) to permit current flow through the transistor Q1 only during positive excursions of the voltage va. Therefore, sink current $i_2$ can only flow during these intervals. Due to the polarities of the transistor Q1 and the diode D2, sink current $i_2$ can only flow as shown to sink power from the load.

As will appear below, the inventive power supply of FIG. 4A supplies a power supply voltage of one polarity at terminal $V_1$ (which is positive) and a recovery voltage at terminal $V_R$ which is of opposite polarity (negative). Obviously, the polarities at both supply and sink terminals could be reversed along with the appropriate polarity of associated components.

Figure 5A:
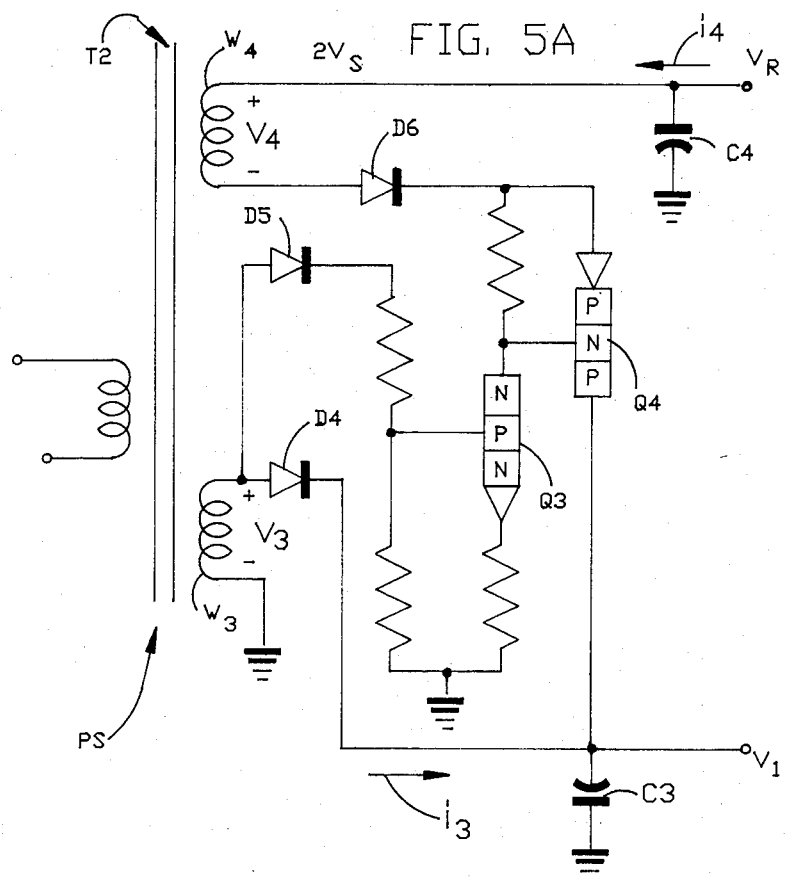
FIG. 5A is a schematic of another embodiment of the inventive power supply.

The inventive power supply whose schematic is shown in FIG. 5A provides both supply voltage (at terminal $V_1$) and recovery voltage (at terminal $V_R$) of identical polarity, although the magnitude of the voltage at terminal $V_R$ is greater than the magnitude of the voltage at terminal $V_1$.

Turning now to FIG. 5A, the power supply terminal $V_1$ is coupled to one terminal of winding $W_3$ of a transformer T2 through a diode D4, and is also coupled to ground through a polarized capacitor C3. Terminal $V_1$ in FIG. 5A supplies power to a load in the same manner that the terminal $V_1$ in FIG. 4A supplies power. The power sink terminal, $V_R$ in FIG. 5A performs the same function as the same terminal in FIG. 4A. However, in the power supply of FIG. 5A the potential available at the terminal $V_R$ is of the same polarity and increased magnitude in comparison to the potential obtained at the terminal $V_1$. The terminal $V_R$ is coupled to a terminal of a winding $W_4$ of the transformer T2, and the other terminal of the winding $W_4$ is coupled to the anode of a diode D6, whose cathode is coupled to an emitter of transistor Q4 and a resistor. The other terminal of the resistor is coupled to the collector of the transistor Q3 and to the base of the transistor Q4. The collector of transistor Q4 is coupled to the terminal $V_1$. The base of transistor Q3 is coupled through a further resistor to the cathode of a diode D5, whose anode is coupled to the anode of diode D4. The base of transistor Q3 is coupled through still another resistor to ground, and the emitter of transistor Q3 is coupled through a further resistor to ground.

Figure 5B:
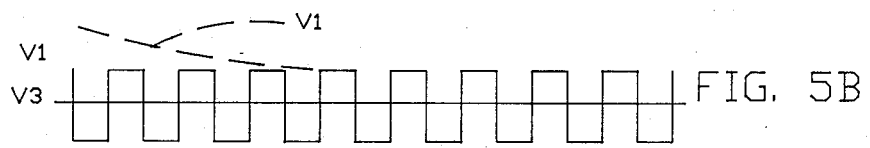
FIGS. 5B–5E illustrate associated waveforms.
Figure 5C:
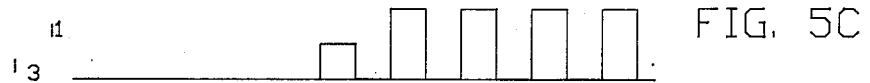
Figure 5D:
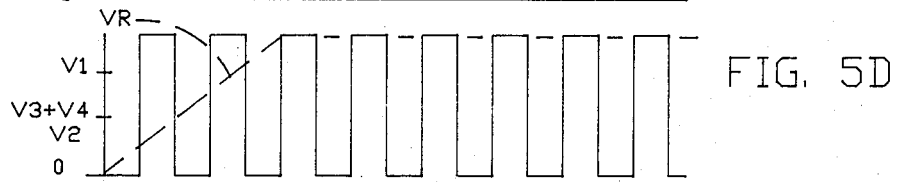
Figure 5E:
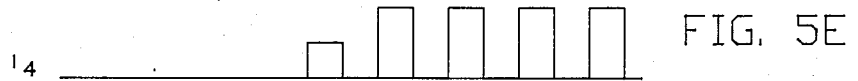

FIGS. 5B-5E illustrate waveforms representative of electrical parameters associated with the power supply of FIG. 5A during its operation. When an alternating voltage of rectangular form is applied to the primary of transformer T2, the voltage across the winding $w_3$ is, in an idealized form, as shown in FIG. 5B. As set forth in regard to FIGS. 4B-4E, there is no power supply current ($i_3$) until the voltage at the supply terminal $V_1$ tends to fall below a threshold voltage approximately equal to the peak value of the voltage $v_3$ across the winding $w_3$. As shown in FIGS. 5D and 5E, the sink voltage at the sink terminal $V_R$ reaches an equilibrium condition at a voltage which is approximately equal to the sum of the peak voltages across the windings $w_3$ and $w_4$. The sink current $i_4$ is illustrated in FIG. 5E, and since the current is into the supply, the sink terminal $V_R$ performs a power sinking function. The supply/sink of FIG. 5A operates in an analogous fashion to that shown in FIG. 4A.

To illustrate advantages gained by using the inventive power supply reference is now made to FIGS. 1, 2A, 2B and 3. FIG. 1 shows a conventional print hammer driver. The motive force for the print hammer is developed by the winding L. It is energized from a source $V_s$ and current flows from the source through transistors Q5 and Q6, through a sensing resistor $R_s$ to ground. The bases of the transistors Q5 and Q6 are controlled by signals from a pulse width modulator control 10, in accordance with the sense voltage developed across the resistor $R_s$. In the course of an on/off transition recovery current is provided from ground through the diode D8, winding L and the diode D7 back to the source.

Figure 2A:
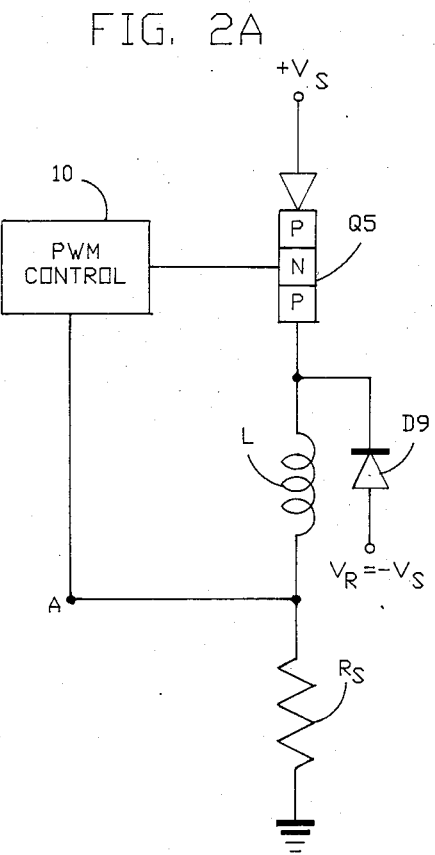
FIGS. 2A, 3, 7B, 7C, 8B and 8C illustrate how the corresponding circuits can be improved by using the power supply of the invention.
Figure 2B:
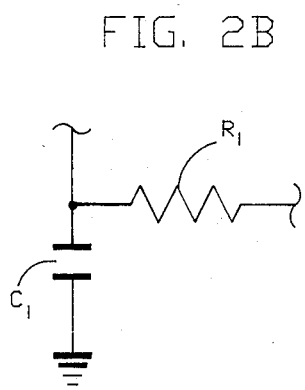
FIG. 2B illustrates a modification which can be made to the circuit of FIG. 2A.

FIG. 2A shows how the circuit of FIG. 1 can be altered when a negative recovery voltage supply, such as that shown in FIG. 4A is available. FIG. 2A differs from FIG. 1 in that the diodes D7 and D8 have been omitted as has transistor Q6, and the diode D9 is coupled from the junction of the transistor Q5 and the winding L to the terminal $V_R$, to be forward biased when the voltage at the junction of the transistor Q5 and the winding L is less than the negative recovery voltage. Thus, at the on/off transition (the transistor Q5 is deenergized) recovery current flows from the terminal $V_R$, through the diode D9, the winding L, through the sensing resistor $R_s$ to ground. The circuit of FIG. 2A has three advantages over the circuit of FIG. 1. Firstly, the recovery time can be improved, secondly, current flows at all times through the sensing resistor $R_s$ and, thirdly, two transistors and two diodes have been displaced by a single transistor and a single diode. The continuity of sense current allows control of the pulse width modulator to be based on average current level and eliminates transitions in the sensed voltage which are caused when the transistors Q6 of FIG. 1 is de-energized. To further improve the ability of the pulse width modulator control to control on average current level, the circuit of FIG. 2B can be inserted at the point A so that the sensed voltage is integrated before being applied to the pulse width modulator control 10.

Figure 3:
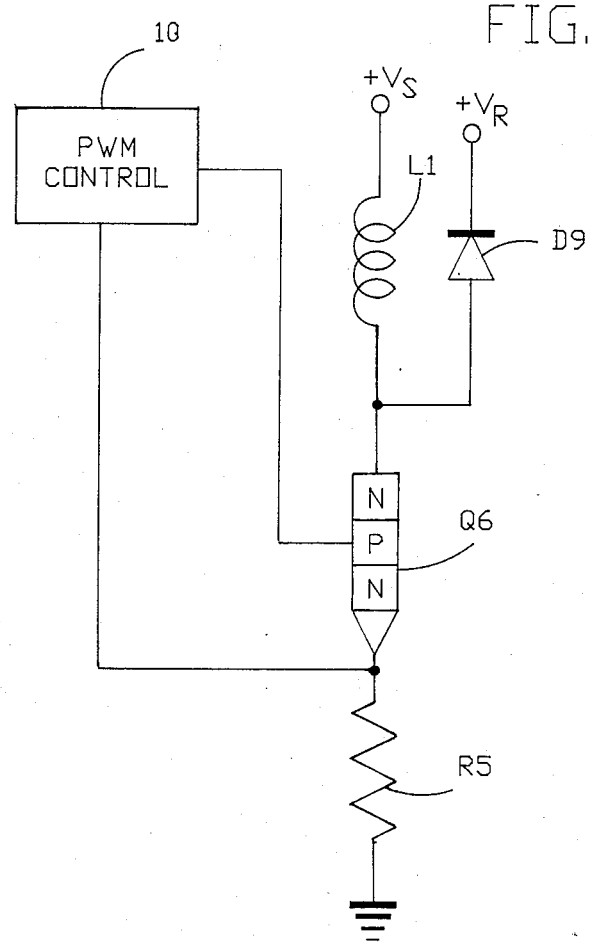

An alternative variation to the driver circuit of FIG. 1 is that shown in FIG. 3, where now the recovery voltage $V_R$ is obtained from the power supply of FIG. 5A. As shown in FIG. 3, the diode D9 is coupled to the junction of the winding L and the transistor Q6 and returned to the terminal $V_R$, poled to be forward biased when the voltage at the junction of L and Q6 exceeds the voltage $V_R$. The circuit of FIG. 3 has two of the three advantages enumerated for the circuit of FIG. 2A (in FIG. 3 sense current is not continuous).

Figure 7A:
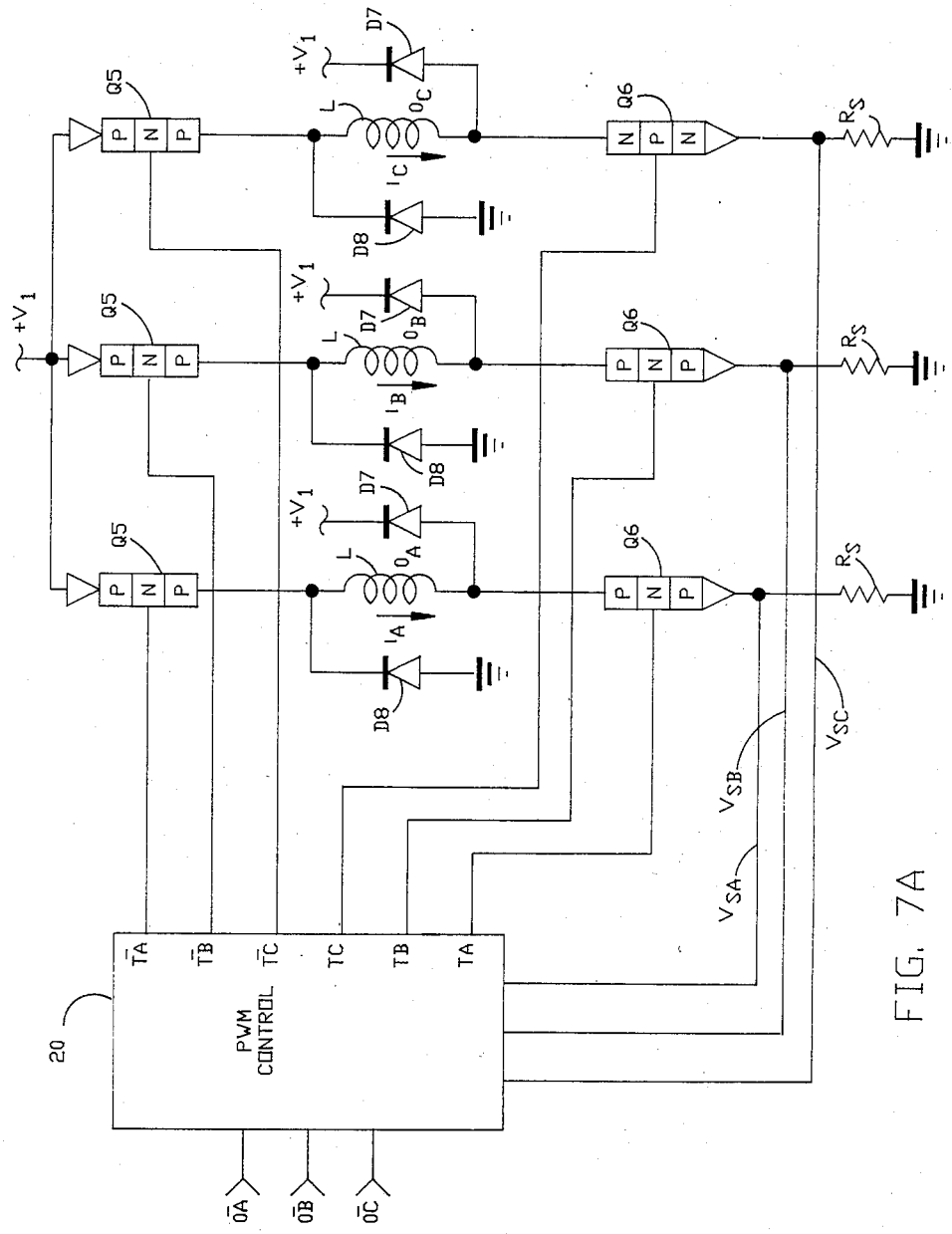
Figure 7B:
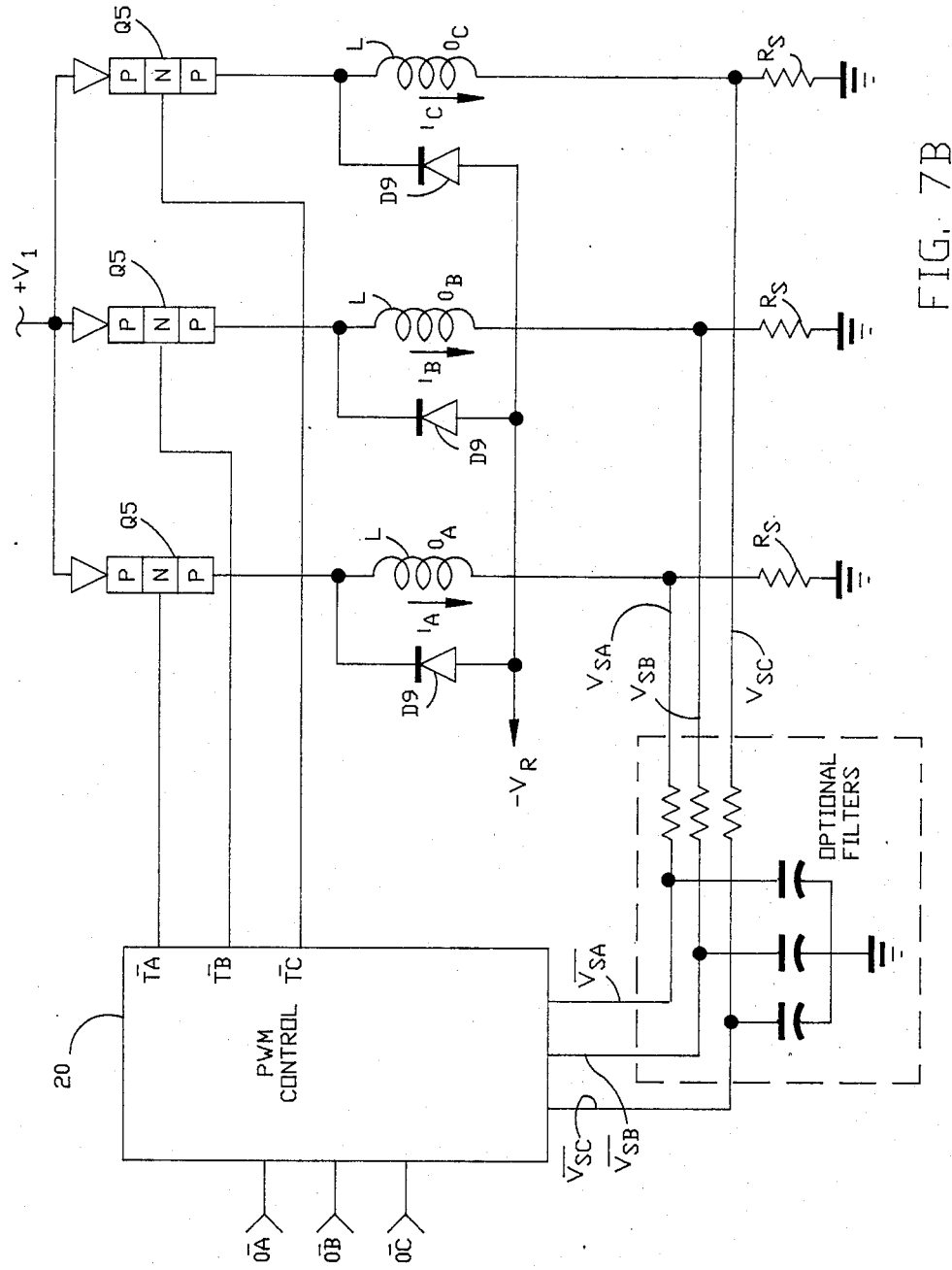

FIG. 7A shows the driver for a 3-phase VR stepper motor. FIG. 7A shows that a driver for each winding L of the stepper motor is identical to the print hammer driver of FIG. 1. The pulse width modulator control 20 is now capable of handling three different phases, and each phase provides a sense voltage back to the control 20. FIG. 7B shows how the stepper motor driver of FIG. 7A can be changed when using the inventive power supply. As seen in FIG. 7B, each phase includes a driver circuit similar to the circuit of FIG. 2A.

Figure 7C:
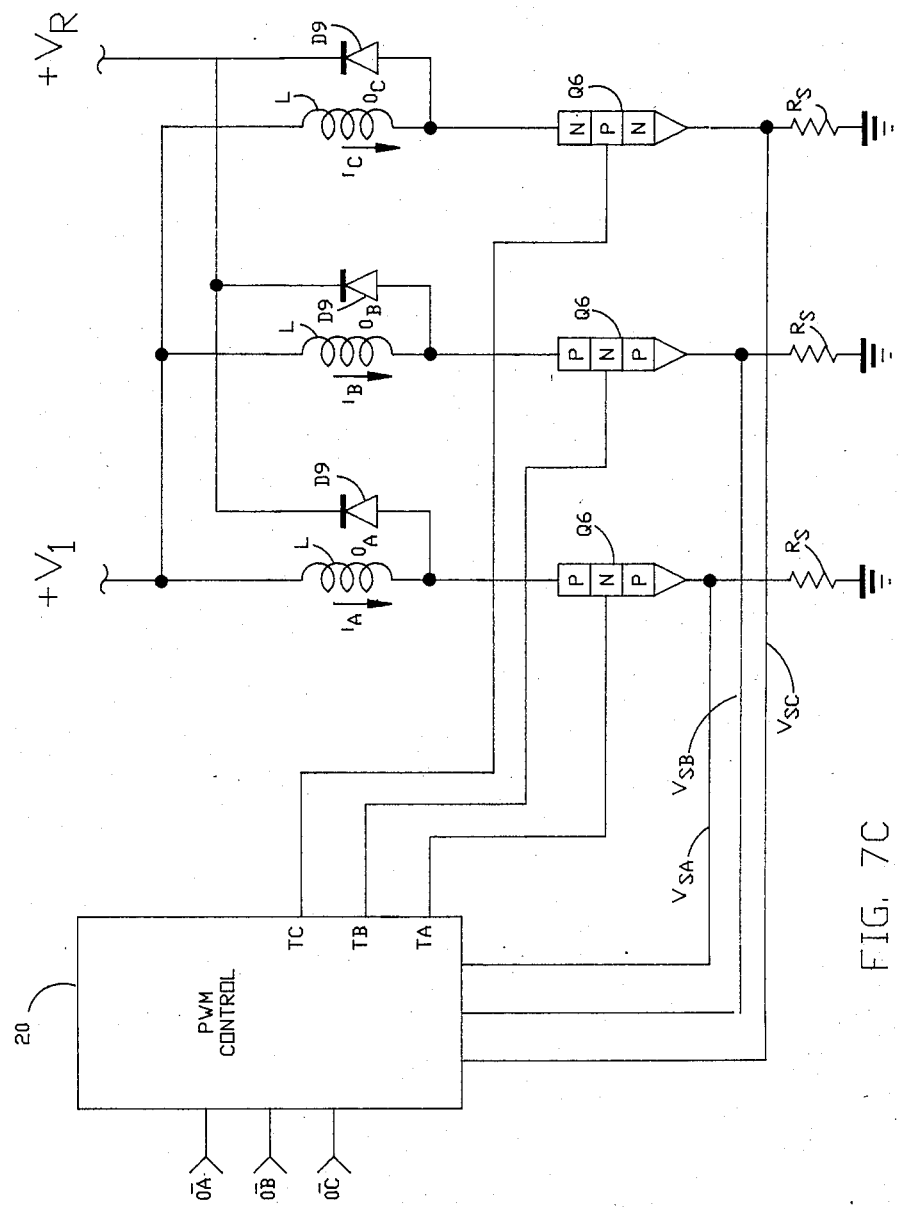

FIG. 7C is a variation of the circuit of FIG. 7A in which each phase is similar to the print hammer driver of FIG. 3.

Figure 8A:
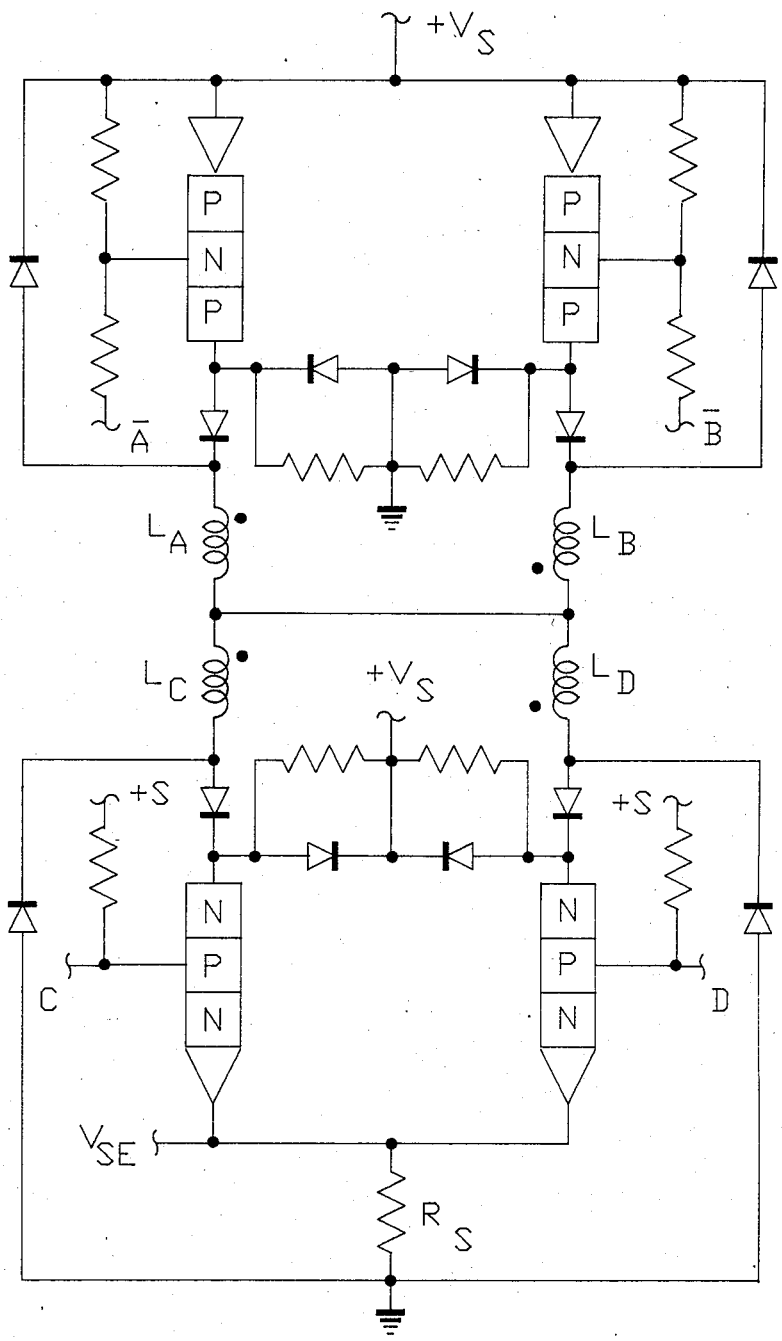
Figure 8B:
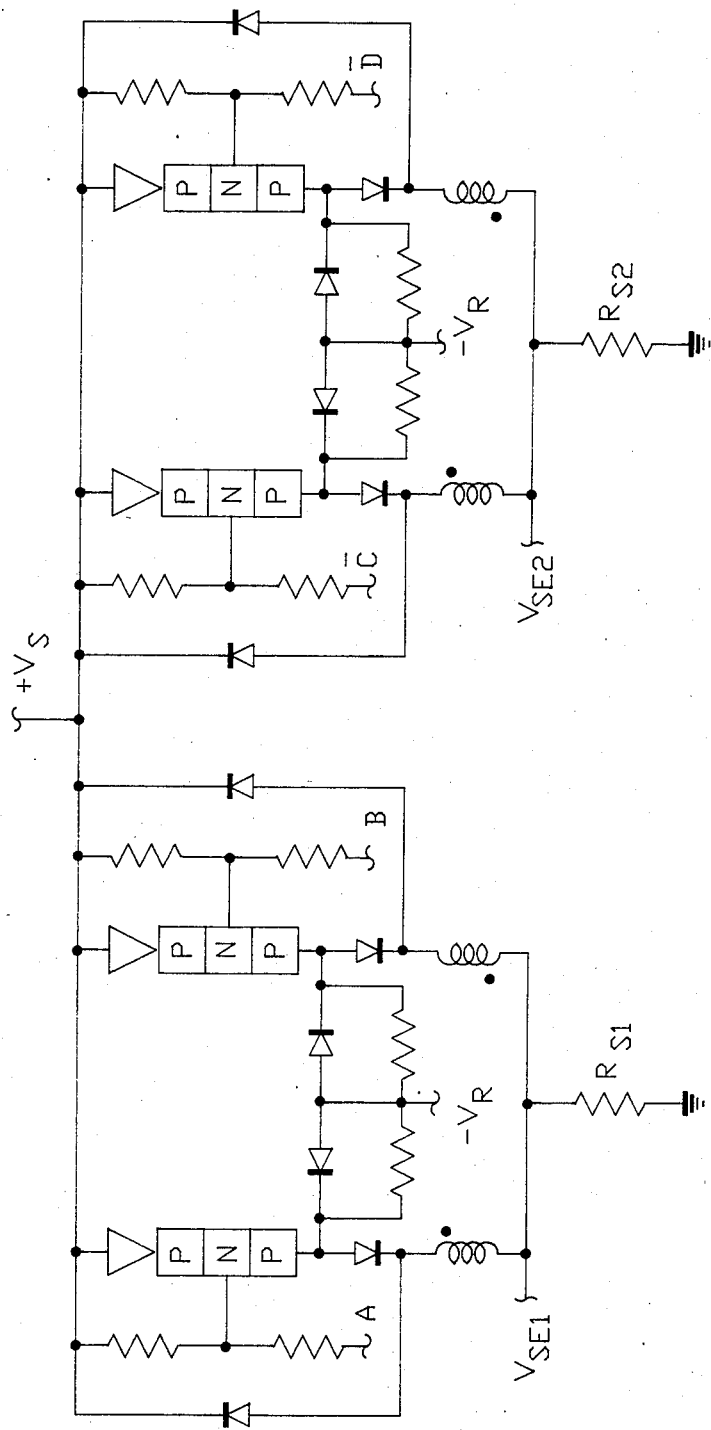
Figure 8C:
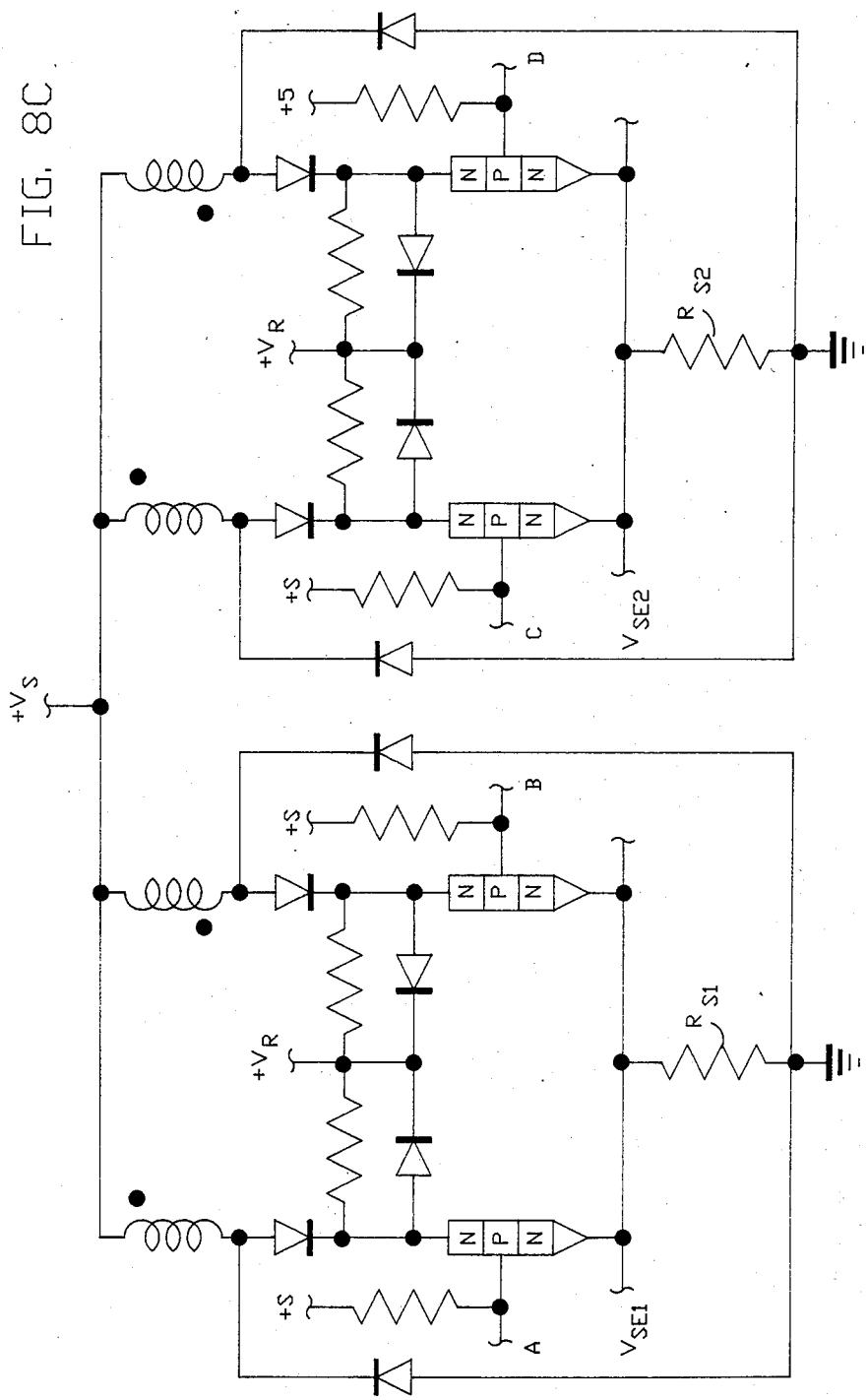

FIG. 8A illustrates a conventional 4-phase bifilar wound PM motor driver in which current recovery is from ground, similar to FIG. 1. On the other hand, FIG. 8B is a modified form of the 4-phase bifilar wound PM driver which employs a negative recovery voltage (see the negative recovery voltage $-V_R$) such as may be available by the power supply/sink of the invention as illustrated in FIG. 4A. FIG. 8C is an alternative variation of the 4-phase bifilar wound PM motor driver in which the recovery voltage ($V_R$) which may be positive and a multiple of the supply voltage $V_s$, such as is supplied by the power source/sink as illustrated in FIG. 5A.

While the circuits of FIGS. 8B and 8C do not exhibit a part count advantage over the circuit of FIG. 8A, they do exhibit other advantages. In FIG. 8A, windings are energized in pairs. When any winding pair is energized, the voltage available is the supply voltage $V_s$. Thus, each winding can drop $V_s/2$. On the other hand, in both FIGS. 8B and 8C, the full supply voltage, $V_s$, is available for each winding of each energized pair. Clearly, this provides a speed advantage in the off/on transition. In the on/off transition, a further speed advantage is exhibited in favor of the drivers of FIGS. 8B and 8C as compared to the driver of FIG. 8A. This speed advantage is derived from the recovery voltage ($-V_R$ in FIG. 8B and $2V_s$ in FIG. 8C) as compared to the grounded recovery terminal in the driver of FIG. 8A.

Referring again to FIG. 4A, now that the use of the invention has been described, it will be apparent that regardless of the load being driven, when a load undergoes an on/off transition current recovery requires current to flow *from* the sink terminal $V_R$. When sink current flows from the sink terminal $V_R$, this tends to pull the terminal $V_R$ further negative. When the voltage at the terminal $V_R$ exceeds, in absolute value, a voltage approximately equal to the voltage across the winding $w_2$, then sink current is conducted through the transistor Q1, the diode D2, the winding $w_2$, and out of the sink terminal. Thus, the circuit including transistor Q1 is a controlled conduction path. This current flow will vary to keep the voltage at the terminal $V_R$ at about the same level as the voltage vb across the winding $w_2$. The flux generated in the transformer core by the flyback or recovery current opposes the flux that is generated by the supply current $i_1$. Accordingly, the energy in the core is a function of the difference between the supply current $i_1$ (flowing from the terminal $V_1$) and the flyback current $i_2$. Thus, the magnetic power supplied by the transformer is limited to supplying motor and driver losses as heat plus the motor output power, e.g. the transformer need not supply power which will be returned in the form of current recovery. Thus, when the transistor switch Q1 is turned on, it operates to couple the winding $W_2$ from the terminal $V_R$ to the voltage reference at ground. The transistor Q1 becomes conductive when a predetermined voltage threshold at terminal $V_R$ is exceeded. The threshold is established by the voltage across winding $W_2$.

As described earlier, with the polarities of the winding voltages va and vb, as shown in FIG. 4A, there is current flow from the terminal of winding $w_1$ which is coupled to the anode of the diode D1, through the diode D3 and the resistors in series therewith turning on the transistor Q2. When the transistor Q2 is turned on, a suitable base voltage is supplied to the transistor Q1 to permit current flow therethrough. As also earlier discussed, there will be current flow through the transistor Q1 if the sink voltage $V_R$ tends to increase in absolute value above the voltage vb.

In the case of a substantially rectangular voltage waveform, the voltage va maintains the transistor Q1 turned on substantially during each positive excursion of the voltage va. With the windings $w_1$ and $w_2$ of the sense shown, the voltage vb is coupled between the sink terminal $V_R$ and ground by the transistor Q1 only when the voltage vb is of the polarity illustrated in FIG. 4A. The level of the voltage at the supply terminal $V_1$ is dependent upon the value of the winding voltage va, and the value of the sink voltage at the sink terminal $V_R$ is dependent upon the value of the winding voltage vb during the positive excursions of the voltage va (which control the transistor switch Q1). The voltages va and vb are, of course, related by the ratio of the turns of the windings $w_1$ and $w_2$.

In many instances, the supply voltage at the supply terminal va is regulated by maintaining the positive excursions of the voltage v1 at a desired level. There are various circuitry approaches for accomplishing this regulation. Of importance in the present instance is the fact that in power supply circuits where the positive excursions of the voltage va are regulated, this results in regulation of the sink voltage at the sink terminal $V_R$. This occurs since the voltage vb can be applied to the sink terminal only during the positive excursions of the voltage va, and during this time the voltage vb has a known relationship to the regulated voltage va based upon the winding turns ratio of the windings $w_2$ and $w_1$.

If the number of turns on the winding $w_2$ is the same as the number of turns on the winding $w_1$, then the equilibrium value of the voltage at terminal $V_R$ will be very close to the value of the voltage at terminal $V_1$. The value of the voltage at $V_R$ will exceed the value of the voltage at $V_1$ by:

$$i_1 R_1 + VD1 + VCE1 + VD2 + i_2 R_2$$

where:
$R_1$ is the resistance of the winding $w_1$,
$R_2$ is the resistance of the winding $w_2$,
VD1 is the voltage across diode D1,
VD2 is the voltage across diode D2, and
VCE1 is the voltage (saturated) across the transistor Q1.

If this difference is unacceptable, the number of turns on the windings can be adjusted to compensate.

Referring now to FIG. 5A, the recovery voltage produced at the terminal $V_R$ in this case is more positive than the value of the supply voltage $V_s$ produced at the terminal $V_1$, and the recovery current flows toward the sink terminal (as is illustrated in FIG. 5A). In the presence of flyback current, the current $i_4$ flowing into the terminal $V_R$ causes the capacitor C4 to be charged as illustrated. When the voltage at terminal $V_R$ becomes greater than the voltage v4 across the winding $w_4$ plus the value of the voltage at terminal $V_1$, then the transistor Q4 becomes conductive and current flows from $V_R$ through $w_4$, D6, and Q4 to the forward voltage supply $V_1$. This current will vary to maintain the value of the voltage of $V_R$ at the level of the voltage v4 across the winding $w_4$ plus the value of the voltage at $V_1$. If the number of turns on the winding $w_4$ is the same as the number of turns on the winding $w_3$, then the voltage at $V_R$ will be about twice the voltage at $V_1$. Of course, if this relationship is not desirable, adjustment can be made to the relative number of turns on the windings $w_4$ and $w_3$. Notice that in the circuit of FIG. 5A, the flux generated in the transformer core by the flyback current (through the winding $w_4$) opposes that generated by the supply current (through the winding $w_3$). For this reason, the energy in the core is a function of the difference between the supply current $i_3$ and the flyback current $i_4$. The magnetic power supplied by the transformer then is limited to that supplying motor and driver losses as heat plus the motor output power, e.g. power flowing out of the terminal $V_1$, which is returned to the terminal $V_R$ as recovery current, need not be supplied by the magnetic supply from the primary. While the supply/sink of FIG. 5A differs from that of FIG. 4A, the transistor Q4 operates on a similar voltage threshold to that of the transistor Q1, and the capability of regulated operation is similar to that described in connection with FIG. 4A. Namely, the circuit including transistor Q4 is a controlled conduction path.

Figure 6:
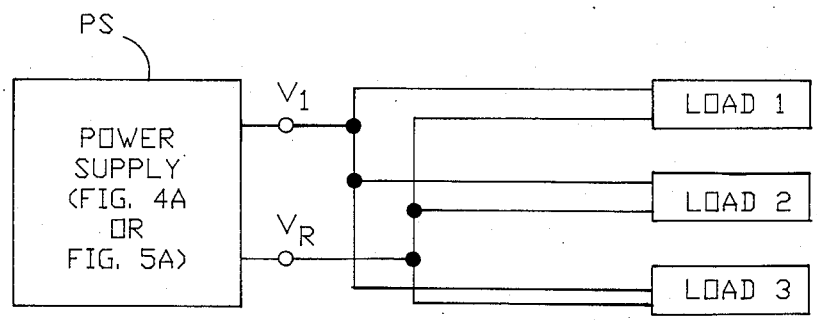
FIG. 6 is a block diagram of the inventive power supply illustrating its application to a plurality of loads in parallel.

As shown in FIG. 6, the inventive power supply PS (of FIG. 4A or 5A) provides power to a load or loads through a terminal $V_1$ and sinks power from the load or loads through a terminal $V_R$. While as shown in FIGS. 2A and 3, the supply PS can be associated with a single load, as indicated in FIG. 6, the supply can be coupled in a multiple to plural loads such as the loads 1, 2 and 3 illustrated in FIG. 6. These loads may comprise different windings of a single stepper motor or in the alternative can represent the windings of different stepping motors. As has been described earlier in regard to FIGS. 4A and 5A, increases in recovery, or sink, current are substantially matched by increases in current flow through a transformer sink winding in order to maintain the sink voltage at the terminal $V_R$ at a desired level.

What is claimed is:

1. A power source/sink for use with an inductive load which is switched between energized and de-energized states, to reduce flyback time by sinking power from the load as the load is de-energized, comprising:
    a transformer with a secondary winding,
    a power supply terminal,
    first means including a rectifier connected to an energy storage device, said first means coupled between said secondary winding of said transformer and said power supply terminal for supplying power to said load,
    a power sink terminal,
    energy storage means coupled between a voltage reference and said power sink terminal,
    controlled conduction path means for supplying current through a conduction path including a further winding of said transformer and said sink terminal in response to said power sink terminal tending to rise in voltage magnitude.

2. The power source/sink of claim 1 in which said controlled conduction path means includes an electronic switch which is enabled to pass current when a voltage at said power sink terminal exceeds, in absolute value, a threshold, said current flowing through said further winding of said transformer.

3. The power source/sink of claim 1 in which said controlled conduction path means includes an electronic switch enabled to pass current when a voltage at said power sink terminal exceeds a preselected, negative threshold, allowing current to flow from a voltage reference, through said electronic switch and through said further winding of said transformer to said power sink terminal.

4. The power source/sink of claim 1 in which said controlled conduction path means includes an electronic switch poled to pass current when a voltage at said power sink terminal rises above a preselected threshold, said current flowing from said power sink terminal through said further winding of said transformer.

5. The power source/sink of claim 1 in which said winding and further winding conduct first and second currents, respectively, and wherein said windings are arranged so that said first and second currents produce magnetic fluxes of opposing polarities.

6. The power source/sink of claim 1 wherein said controlled conduction path means includes:
    a first electronic switch coupled in series with said further winding,
    a second electronic switch establishing a voltage threshold relative to said sink terminal, and coupling means responsive to conduction of said second electronic switch for enabling conduction in said first electronic switch.

7. The power source/sink of claim 6 in which said coupling means includes a conductive connection between a control electrode of said first electronic switch and a terminal of said second electronic switch.

8. The power source/sink of claim 7 in which supply current flowing in said secondary winding produces first magnetic flux and recovery current flowing in said further winding produces a second magnetic flux and wherein said secondary and further windings are poled so said first and second magnetic fluxes are opposing.

9. A power transfer system including a power source/sink, and an inductive load coupled thereto which exhibits a reduction in flyback time by sinking power from the load as the load is de-energized, comprising:
    a power supply including a transformer, a secondary winding with a power supply terminal, first means including a rectifier connected to an energy storage device, said first means coupled between said secondary winding and said power supply terminal for supplying power to a load,
    a power sink terminal, energy storage means coupled between a voltage reference and said power sink terminal, and controlled conduction path means for supplying current through a conduction path including a further winding of said transformer and said sink terminal in response to a rise, in absolute value, of a voltage at said power sink terminal,
    and a load coupled thereto comprising a series circuit including an electronic switch, an inductive winding coupled between said power supply terminal and ground, and a diode coupled between the junction of said switch and said winding and said power sink terminal.

10. The system of claim 9 in which said diode is poled to be forward biased when a voltage at said power sink terminal is below a voltage at the junction of said winding and said electronic switch.

11. The system of claim 9 in which said diode is poled to be forward biased when a voltage at the of said winding and said electronic switch exceeds the voltage at said power sink terminal.

12. A power transfer system including a power source/sink, and an inductive load coupled thereto which exhibits a reduction in flyback time by sinking power from the load as the load is de-energized, comprising:
    a power supply including a transformer, a secondary winding with a power supply terminal, first means including a rectifier connected to an energy storage device, said first means coupled between said secondary winding and said power supply terminal for supplying power to a load,
    a power sink terminal, energy storage means coupled between a voltage reference and said power sink terminal, and controlled conduction path means for supplying current through a conduction path including a further winding of said transformer and said sink terminal in response to a rise, in absolute value, of a voltage at said power sink terminal,
    and a load comprising a pair of driver circuits coupled between said power supply terminal and ground, each driver circuit including a pair of parallel branches coupled between said power supply terminal and a sensing resistor, said sensing resistor coupled to ground, each said branch comprising a series circuit including an electronic switch, a series diode and an inductive winding, and a parallel circuit including a resistor and diode coupled between a junction of said electronic switch and said series diode and said power sink terminal.

13. A power supply and power sink arrangement comprising:
- a power supply terminal;
- a power sink terminal;
- a transformer having a primary winding which is couplable to a varying voltage source and having a supply winding and a sink winding;
- means, coupled to a first side of the supply winding, for producing a power supply voltage at the power supply terminal;
- means for coupling the sink winding between the power sink terminal and a reference potential when a voltage of a first polarity is produced at the first side of the supply winding; and
- means for permitting sink current flow through the sink winding when a voltage at the power sink terminal exceeds in magnitude a combination of (a) the voltage across the sink winding and (b) the reference potential.

* * * * *

UNITED STATES PATENT AND TRADEMARK OFFICE
CERTIFICATE OF CORRECTION

PATENT NO. : 4,661,882

DATED : April 28, 1987

INVENTOR(S) : Donald R. Presley

It is certified that error appears in the above-identified patent and that said Letters Patent is hereby corrected as shown below:

The inventor's name should read -Donald R. Presley-.

Col. 4, line 17, change "inabsolute" to -in absolute-.

Col. 6, line 10, change "displaced" to -replaced-.

Col. 7, line 63, change "va" to -$V_1$-;

line 64, change "v1" to -va-.

Col. 10, line 38 (claim 11, line 2), after "the" insert -junction-.

Signed and Sealed this

Twenty-second Day of September, 1987

*Attest:*

DONALD J. QUIGG

*Attesting Officer*      Commissioner of Patents and Trademarks